United States Patent [19]

Rowe, Jr. et al.

[11] Patent Number: 5,596,550
[45] Date of Patent: Jan. 21, 1997

[54] LOW COST SHADING FOR WIDE SONAR BEAMS

[75] Inventors: Linwood M. Rowe, Jr., Severna Park; Thomas C. Montgomery, Easton; Frederick G. Geil, Annapolis; Brad M. Fye, Crownsville, all of Md.

[73] Assignee: Northrop Grumman Corporation, Los Angeles, Calif.

[21] Appl. No.: 492,649

[22] Filed: Jun. 20, 1995

[51] Int. Cl.$^6$ .................................................... G01S 15/00
[52] U.S. Cl. ............................................ 367/103; 367/119
[58] Field of Search ........................... 367/103, 119, 367/905, 138; 128/661.01

[56] References Cited

U.S. PATENT DOCUMENTS

| | | | |
|---|---|---|---|
| 4,291,396 | 9/1981 | Martin | 367/905 |
| 4,661,938 | 4/1987 | Jones et al. | 367/123 |
| 5,309,409 | 5/1994 | Jones et al. | 367/103 |
| 5,436,872 | 7/1995 | Gilmour et al. | 367/103 |

*Primary Examiner*—Ian J. Lobo
*Attorney, Agent, or Firm*—Walter G. Sutcliff

[57] ABSTRACT

A shallow water sonar apparatus and a method of processing outputs from a shallow water sonar array, where the array consists of at most two elements for receiving the acoustic energy from a plurality of directions. The apparatus also includes a beamformer for processing the acoustic energy received by the two elements to produce a tapered beam pattern which approximates a beamformer output from an array including substantially more than two elements. The tapered beam pattern is produced by asymmetrically amplitude shading outputs of the two elements, such that the output of one of the two elements is summed, without shading, with an output of the second element, shaded by a coefficient factor of 0.23.

22 Claims, 8 Drawing Sheets

LOW COST SHADING FOR WIDE SONAR BEAMS

BACKGROUND OF THE INVENTION

The invention relates generally to an apparatus and method for shaping beam patterns (the acoustic response) of sonar systems. In particular, the apparatus and method provide a low cost technique for shading an array of elements with as few as two elements, which is particularly effective but not limited to shallow water sonar applications.

The goal of a sonar system is to receive energy from a wide field of view, while still being able to reject energy from certain undesired angles. As illustrated in FIG. 1, the sonar system 10 should receive energy from the wide field of view 12 illustrated, but be able to reject energy received from the surface, in the form of surface clutter 14 from the water surface 16. The classical approach for achieving this objective is to use an array of elements (or hydrophones) and a beamformer, as illustrated in FIG. 2.

The processing of multichannel data arises naturally when manipulating data from an array of spatially distributed sensors. The problem of coherently summing the outputs from such a collection of sensors is known as beamforming. A beamformer permits one to listen preferentially to wave fronts propagating from one direction over another. With the addition of a filter on the output of each sensor prior to the summation as shown in FIG. 2, conventional beamformers can provide both spatial and spectral filtering on the incoming wave field.

As illustrated in FIG. 2, a sound source 20 emits signals in the look direction of the sonar system 10. The sound source typically is an echo signal from a target that has been ensonified. The sonar system 10 also receives noise in the direction of the sound source 20, as well as noise 22 from directions other than the look direction. The signal from sound source 20 and noise 22 are received by an array of spatially distributed sensors 24 including $sensor_0$, $sensor_1$, ..., $sensor_{N-1}$. The output of $sensor_0$ through $sensor_{N-1}$ are input to band pass filters 26, amplified by amplifier 28, and input to conventional beamformer 30.

The beam pattern produced by such a linear array has side lobes, wherein energy from unwanted directions is received. The classic approach for correcting for the formation of side lobes is aperture shading. When low side lobes are required, amplitude shading of array elements is used to reduce the side lobes by reducing the amplitude contribution of some of the elements.

The traditional approach for performing amplitude shading includes subdividing the linear array aperture and applying symmetric shading coefficients to each of the elements. Using this approach requires a minimum of three elements in the linear array in the plane where the beam pattern is desired.

An example of a conventional linear array is shown in FIGS. 3(a) and 3(b). The array 32 of FIG. 3(a) includes seven isotropic elements 34 spaced $\lambda_0/2$ apart along a straight line, where $\lambda_0$ is the wavelength of the center frequency $\omega_0$ of the array 32. The received signals are summed to produce an array output signal. The beam pattern, that is, the relative sensitivity of response to signals from various directions, is plotted in a plane over an angular range of $-\pi/2<\theta<\pi/2$ for frequency $\omega_0$. This pattern is symmetric about $\theta=0°$ as well as $\theta=90°$, and the main lobe 36 is centered at $\theta=0°$. The largest-amplitude sidelobe 38, at $\theta=24°$, has a maximum sensitivity which is only 12.5 dB below the maximum main-lobe sensitivity. The same array configuration is shown in FIG. 3(b); however, in this case the output of each element is delayed in time by delays 40, before being summed. The resulting directivity pattern now has its main lobe 36 at an angle of $\psi$ radians, where:

$$\psi = \sin^{-1}\frac{\lambda_0\delta\omega_0}{2\pi dT} = \sin^{-1}\frac{c\delta}{d}$$

where $\omega_0$=the normalized frequency of received signal (in radians)

$\lambda_0$ =the wavelength at frequency $\omega_0$ (in meters)

$\delta$=the time-delay difference between neighboring element outputs (in number of samples-seconds)

d=the spacing between antenna elements (in meters)

c=the signal propagation velocity equal to $(\lambda_0\omega_0)/(2\pi T)$ in meters/second, and T=the time step delay (in seconds).

The sensitivity is maximum at the angle $\psi$ because signals received from a plane-wave source incident at this angle, and delayed as in FIG. 3(b), are in phase with one another and produce the maximum output signal. For the example illustrated, $d=\lambda_0/2$, $\delta=(0.8131/\omega_0)$, and therefore $\psi=\sin^{-1}(\delta\omega_0/\pi)=15°$.

There are many possible configurations for phased arrays of elements. FIGS. 4(a) and 4(b) show one such configuration where each of the array element outputs is weighted by two weights in parallel, one being preceded by a time delay of a quarter of a cycle at frequency $\omega_0$ (i.e., a 90° phase shift, or $\pi T/2\omega_0$ seconds$^2$). The output signal is the sum of all weighted signals, and since all weights in weighting circuits 42 are set to unit values, the beam pattern at frequency $\omega_0$ is by symmetry the same as that of FIG. 3(a). For purposes of illustration, a directional sinusoidal noise 44 of frequency $\omega_0$ incident on the array is shown in FIG. 4(a). The angle of incidence (45°) of the noise 44 is such that it would be received on one of the sidelobes 46 of the beam pattern with a sensitivity only 17 dB less than that of the main lobe 36 at $\theta=0°$.

If the weights 42 are symmetrically set as set forth below, the beam pattern at frequency $\omega_0$ is modified:

| WEIGHT VALUES | |
|---|---|
| $w_{01} = 0.099$ | $w_{32} = -1.233$ |
| $w_{02} = 1.255$ | $w_{41} = -0.182$ |
| $w_{11} = -0.266$ | $w_{42} = -1.610$ |
| $w_{12} = -1.518$ | $w_{51} = 0.266$ |
| $w_{21} = 0.182$ | $w_{52} = 1.519$ |
| $w_{22} = 1.610$ | $w_{61} = 0.099$ |
| $w_{31} = 0.000$ | $w_{62} = 1.255$ |

In this case, the main lobe 36 is almost unchanged from that shown in FIGS. 3(a) and 4(a), while the particular sidelobe 46 that previously intercepted the sinusoidal noise 44 in FIG. 4(a) has been shifted so that a null is now placed in the direction of the sinusoidal noise 44. The sensitivity in the noise direction is 77 dB below the main-lobe sensitivity, improving the noise rejection by 60 dB.

Each element in the linear array 32 requires electric wiring and cabling to connect the element to the beamformer 30. Further, as the number of elements is increased, the number of inputs to the beamformer 30 also increases, and as a result, the beamforming operation becomes more complex. In order to perform beamforming on an array with a large number of elements, a large amount of computer processing time is required.

The present invention achieves a beam pattern, which is substantially equivalent to a beam pattern achieved with a large number of elements, utilizing only two elements. The use of only two elements permits the array to be extremely simple because wiring and cabling for only two elements is required, and only two inputs are supplied to the beamformer, thereby requiring less computer processing time to perform the beamforming operation.

The present invention is an improvement over conventional apparatus and methods for performing shading on wide beam sonar systems, in that the present method and apparatus only requires two elements. Further, the outputs of these two elements can be passively summed or combined into one amplifier. Still further, the measured pattern demonstrates the cutoff rate and rejection of energy towards unwanted angles, such as in the direction of surface clutter.

SUMMARY OF THE INVENTION

One object of the present invention is to provide a novel apparatus and method for performing low cost shading for wide sonar beams. This novel apparatus and method utilizes only two sensor elements, in order to provide the most cost-effective beamformer output. Since only two sensor elements are required, only two sets of wiring and cabling are required. Also, only two inputs are provided to the beamformer, as a result, beamformer processing is significantly reduced, since only two sensor element inputs require processing.

The output of the beamformer utilizing the novel apparatus and method of the present invention achieves a beam pattern which is substantially identical to beam patterns generated by sensor element arrays with substantially more elements.

Another object of the present invention is to provide a novel apparatus and method for performing low cost shading for wide sonar beams, which utilizes asymmetric amplitude shading in conjunction with the two sensor element array, in order to produce a beam pattern output, which is substantially identical to the beamformer output produced by a sensor element array including a substantially larger number of elements.

A further object of the present invention is to provide an apparatus and method for low cost shading for wide sonar beams, wherein the asymmetric shading combines a 100% level of the first hydrophone element and a 23% value of the second element, in order to achieve the desired beam pattern.

These objects of the present invention are fulfilled by providing an apparatus comprising at most two array elements for receiving acoustic energy from a plurality of directions, and beamforming means for processing the acoustic energy to produce a beamformed output which enhances detectivity in at least one of the plurality of directions.

These objects of the present invention are further fulfilled by providing a method of shading outputs of at most two array elements comprising the steps of (a) receiving acoustic energy from the at most two array elements from a plurality of directions, and (b) processing the acoustic energy to produce a beamformed output which enhances detectivity in at least one of the plurality of directions.

These objects of the present invention are further fulfilled by providing a shallow water sonar apparatus, comprising an array, consisting of two elements, for receiving acoustic energy from a plurality of directions, and beamforming means for processing the acoustic energy received by said two elements to produce a tapered vertical beam pattern which approximates a beamformer output from an array including more than two elements, said beamforming means asymmetrically amplitude shading raw outputs of said two elements, wherein the raw output of a first of said two elements is summed with the raw output of a second of said two elements multiplied by a coefficient of 0.23.

These objects of the present invention are further fulfilled by providing a method of processing outputs of a shallow water sonar array, consisting of two elements, said method comprising the steps of (a) receiving acoustic energy from the two elements from a plurality of directions, and (b) processing the acoustic energy received by said two elements to produce a tapered vertical beam pattern which approximates a beamformer output from an array including more than two elements by asymmetrically amplitude shading raw outputs of the two elements, wherein the raw output of a first of the two elements is summed with the raw output of a second of the two elements multiplied by a coefficient of 0.23.

These and other objects of the present invention will become more readily apparent from the detailed description given hereafter. However, it should be understood that detailed description of the specific examples, while indicating preferred embodiments in the invention are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow in the accompanying drawings, which are given by way of illustration only and thus do not limit the present invention, wherein.

Further scope of applicability of the present invention will become apparent from the detailed description given hereafter. However, it should be understood that the detailed description and specific examples, while indicating preferred embodiments of the invention are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
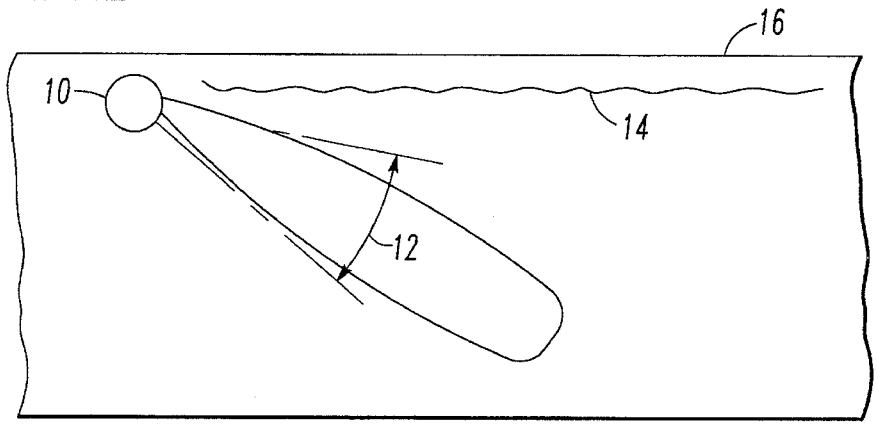
FIG. 1 illustrates the vertical coverage pattern of a conventional sonar system.
Figure 2:
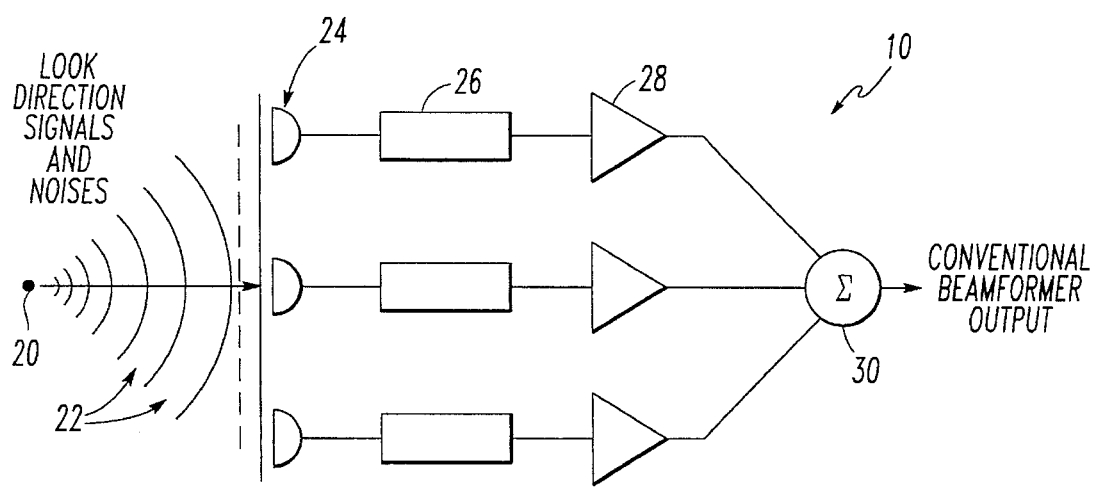
FIG. 2 illustrates the structure of the conventional sonar system of FIG. 1.
Figure 3A:
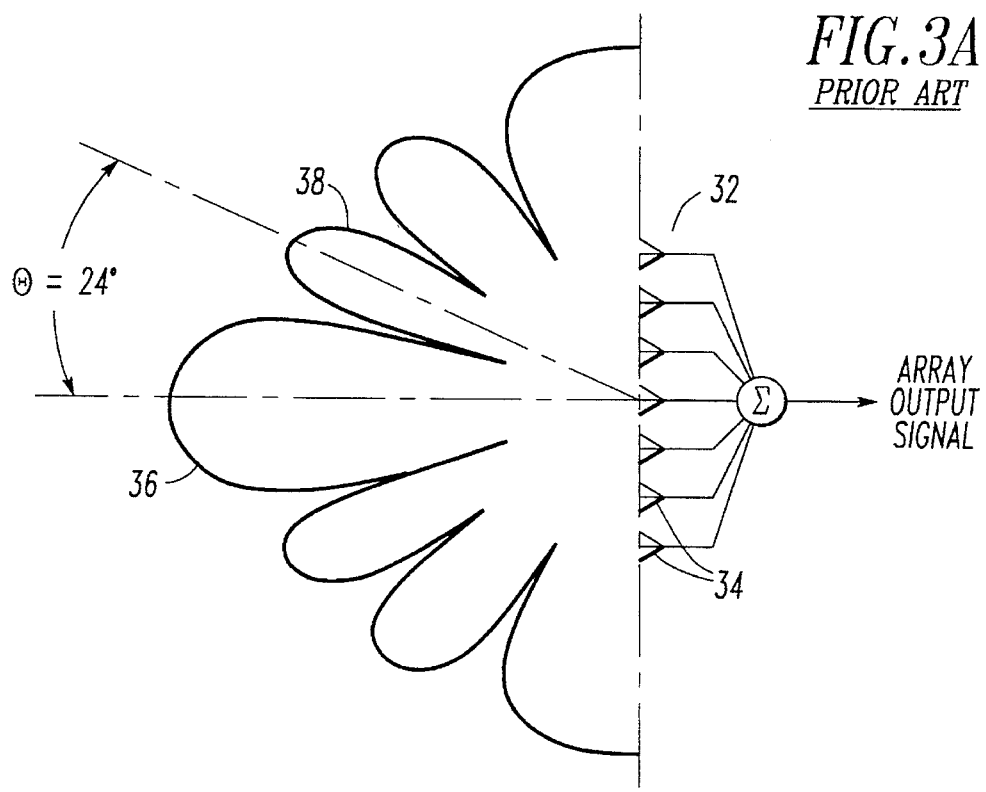
FIGS. 3(a) and 3(b) illustrate the beam patterns produced using no time delays and time delays, respectively.
Figure 3B:
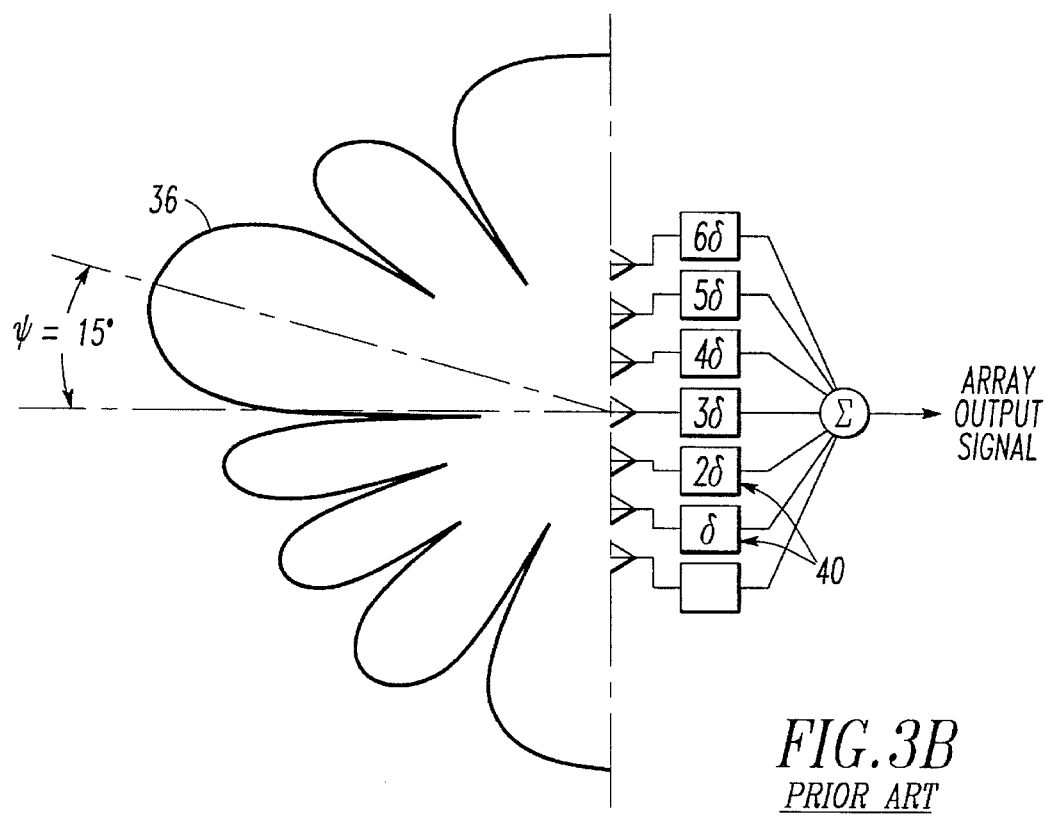
Figure 4A:
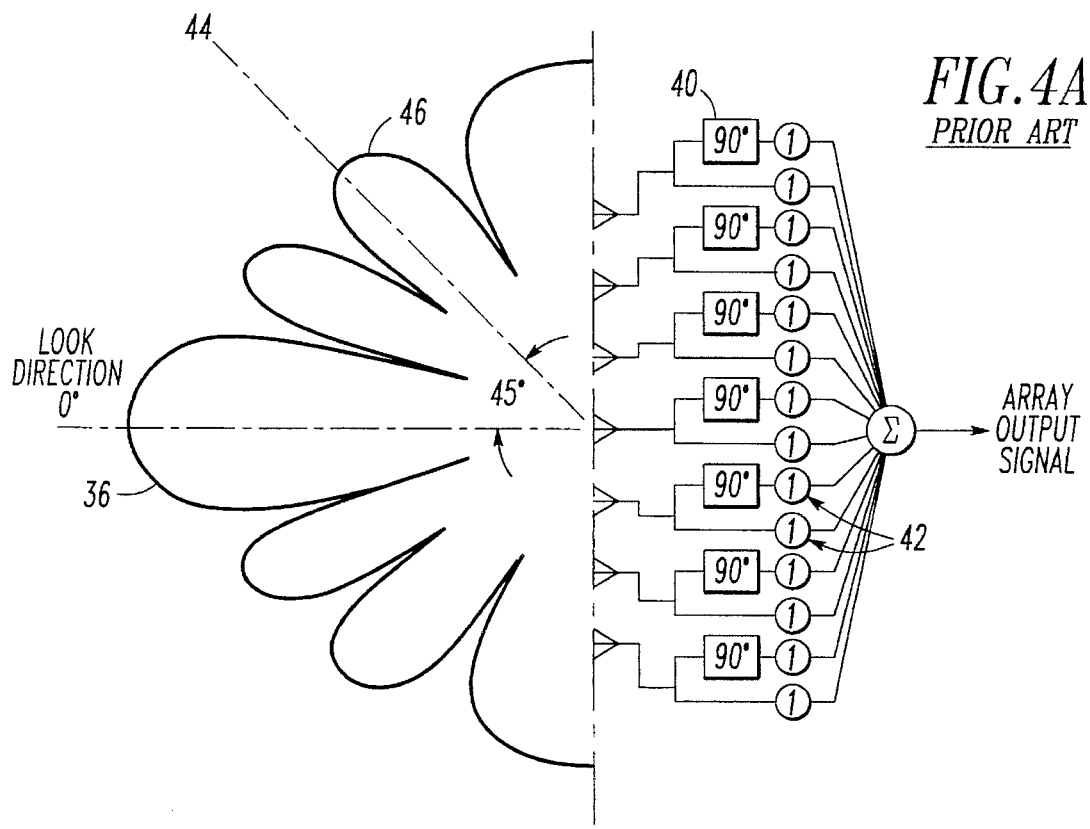
FIGS. 4(a) and 4(b) illustrate the beam pattern produced using uniform weighting and symmetric weighting, respectively.
Figure 4B:
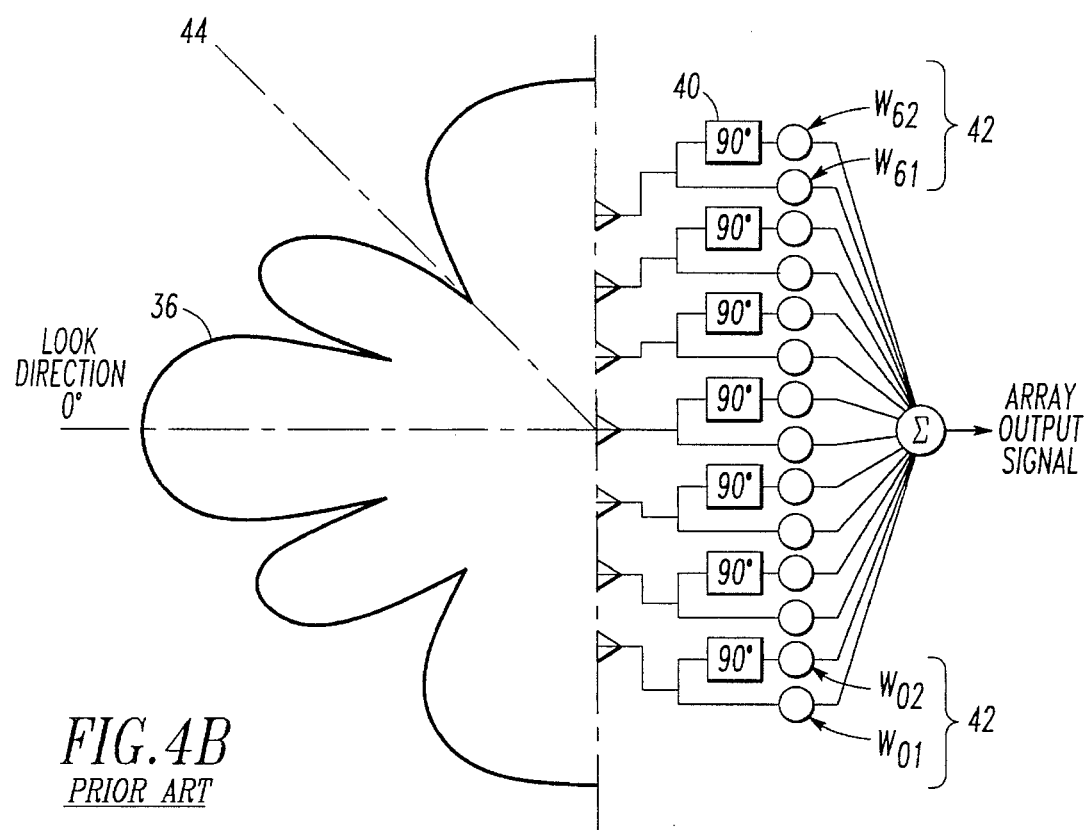
Figure 5:
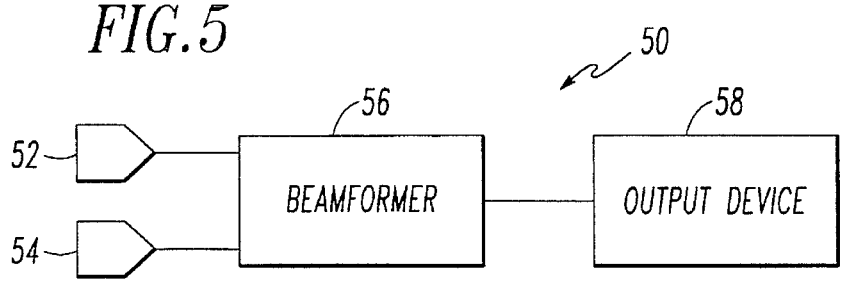
FIG. 5 illustrates the sonar system in one embodiment of the present invention.

The overall sonar system 50 is illustrated in FIG. 5 and includes a first array element 52 and a second array element 54, which receive acoustic energy from a sound source (not shown). Outputs of the first array element 52 and the second array element 54 are input to the beamformer 56, asymmetrically amplitude shaded, and coherently summed to produce a beam pattern. The beam pattern is output to output device 58 for display. The output device 58 could be a navigational processor for an unmanned underwater vehicle, or a printer, plotter, or CRT.

Figure 6:
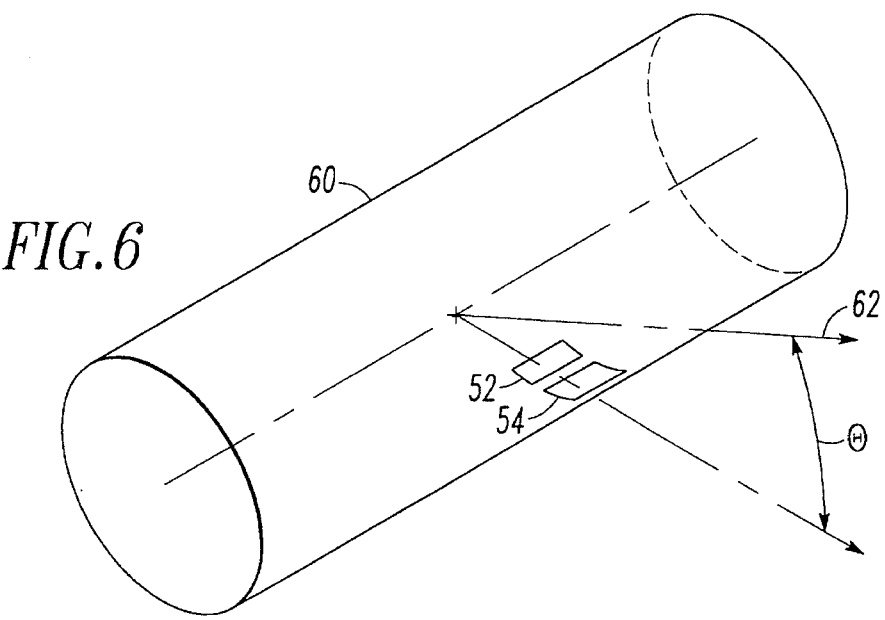
FIG. 6 illustrates the two array elements of FIG. 5, mounted on an underwater vehicle.

FIG. 6 illustrates the two array elements 52 and 54 of the present invention, mounted on an underwater vehicle 60. The two array elements 52 and 54 may also be mounted on the below water portion of the hull of a ship. As illustrated in FIG. 6, array elements 52 and 54 are designed to detect acoustic energy at a given depression angle θ, below the horizontal 62. In the embodiment illustrated in FIG. 6, the depression angle is 16°.

Figure 7:
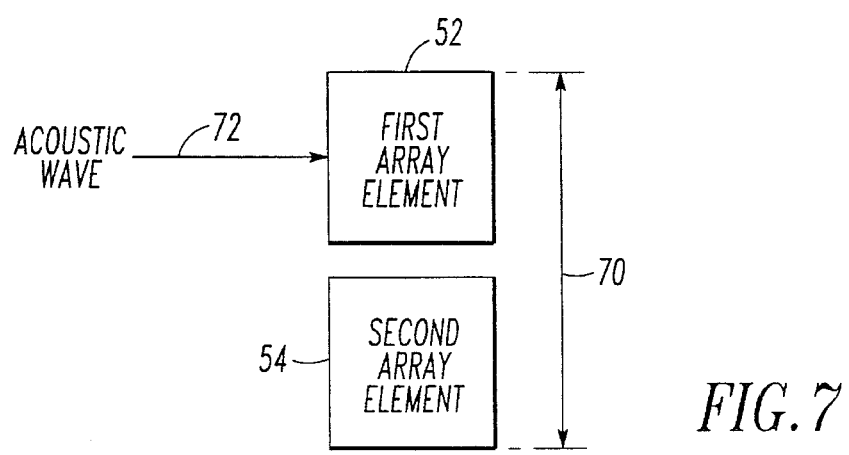
FIG. 7 illustrates the acoustic aperture formed by the two array elements of FIG. 5.

As illustrated in FIG. 7, array elements 52 and 54 define the acoustic aperture 70, which receives acoustic waves 72, at a predetermined angle. In the preferred embodiment of the present invention, asymmetric amplitude shading is employed. In particular, the weighting coefficients applied are asymmetrical with respect to a central array element. In the preferred embodiment of the present invention, two level asymmetric shading is employed wherein the shading coefficient utilized for array element 52 is 1.00 or 100%, whereas the shading coefficient for array element 54 is 0.23 or 23%. These coefficients could also be varied to produce a range of angular beam pattern response shapes.

Figure 8:
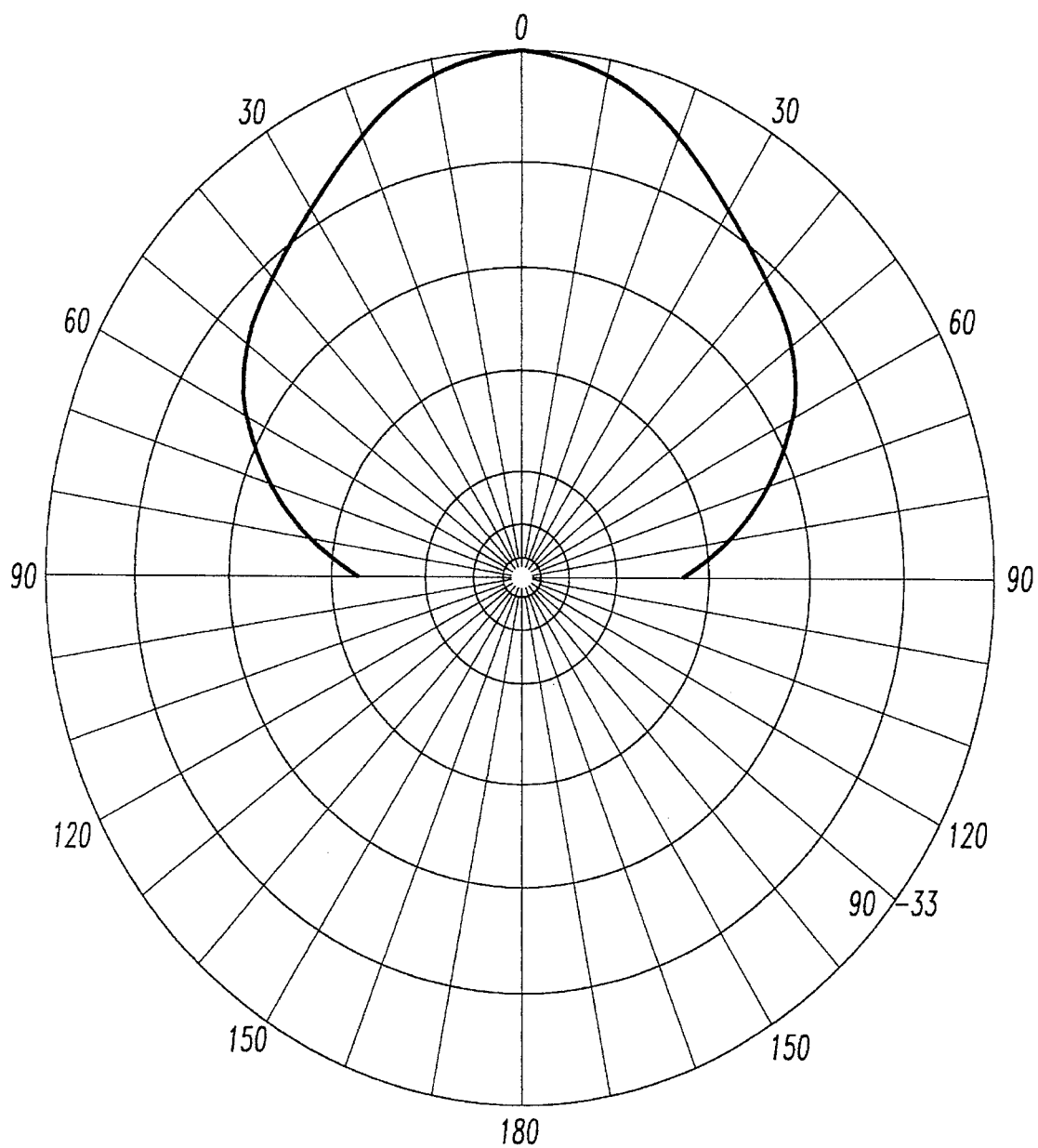
FIG. 8 illustrates a computed beam pattern at 160 kHz in the preferred embodiment of the present invention.

FIG. 8 illustrates a first beam pattern using the asymmetric shading coefficients discussed above, having a center frequency of 160 kHz. The beamwidth of the beam illustrated in FIG. 8 is 34.25 Hz, and as is clearly illustrated from FIG. 8, no sidelobes are produced in this configuration.

Figure 9:
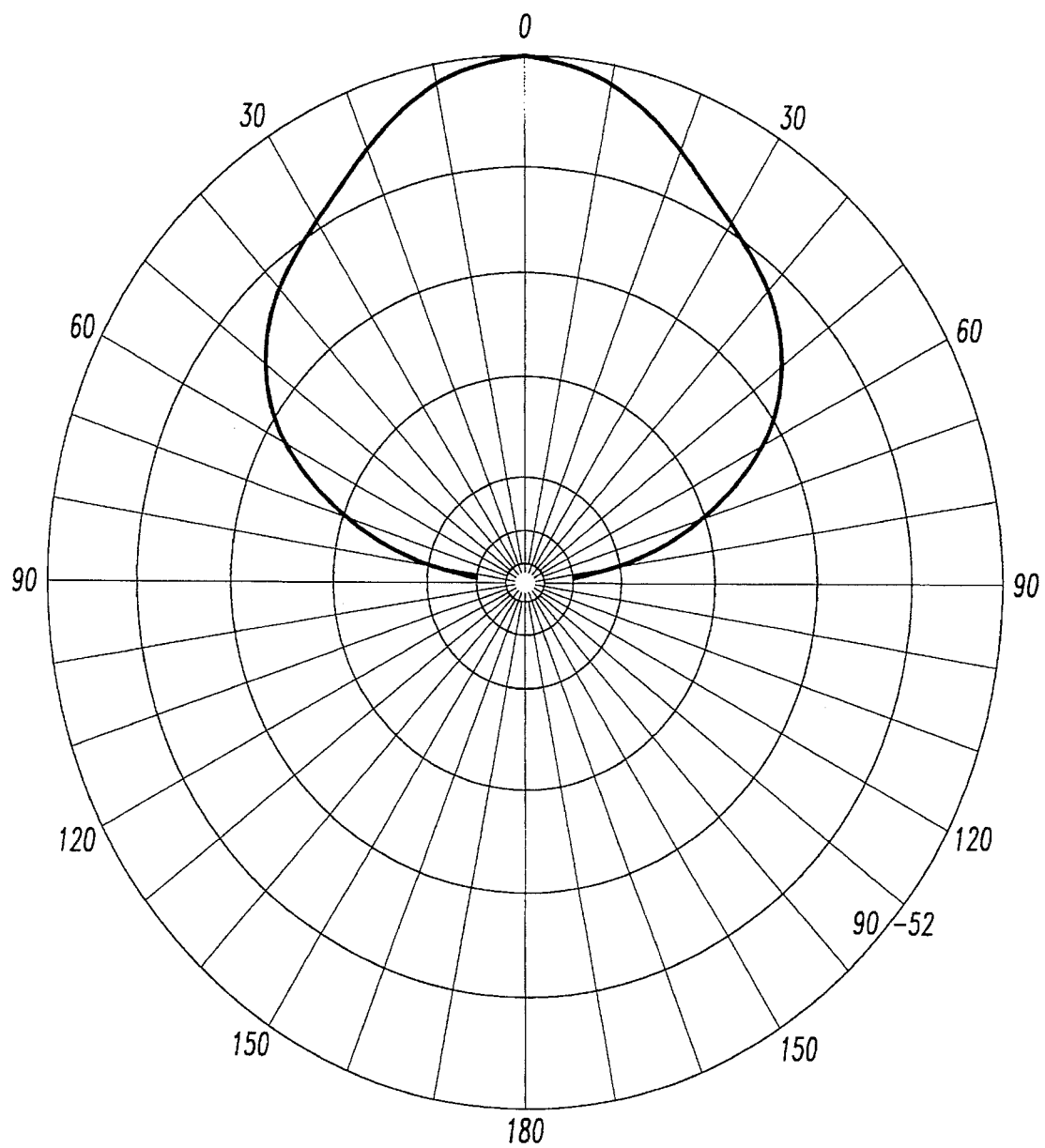
FIG. 9 illustrates a computed beam pattern at 180 kHz in the preferred embodiment of the present invention.

FIG. 9 illustrates a second beam pattern produced at 180 kHz, using the asymmetric shading illustrated above. The bandwidth of the beam illustrated in FIG. 9 is 30.25 Hz. Again, no sidelobes are produced in this configuration.

Figure 10:
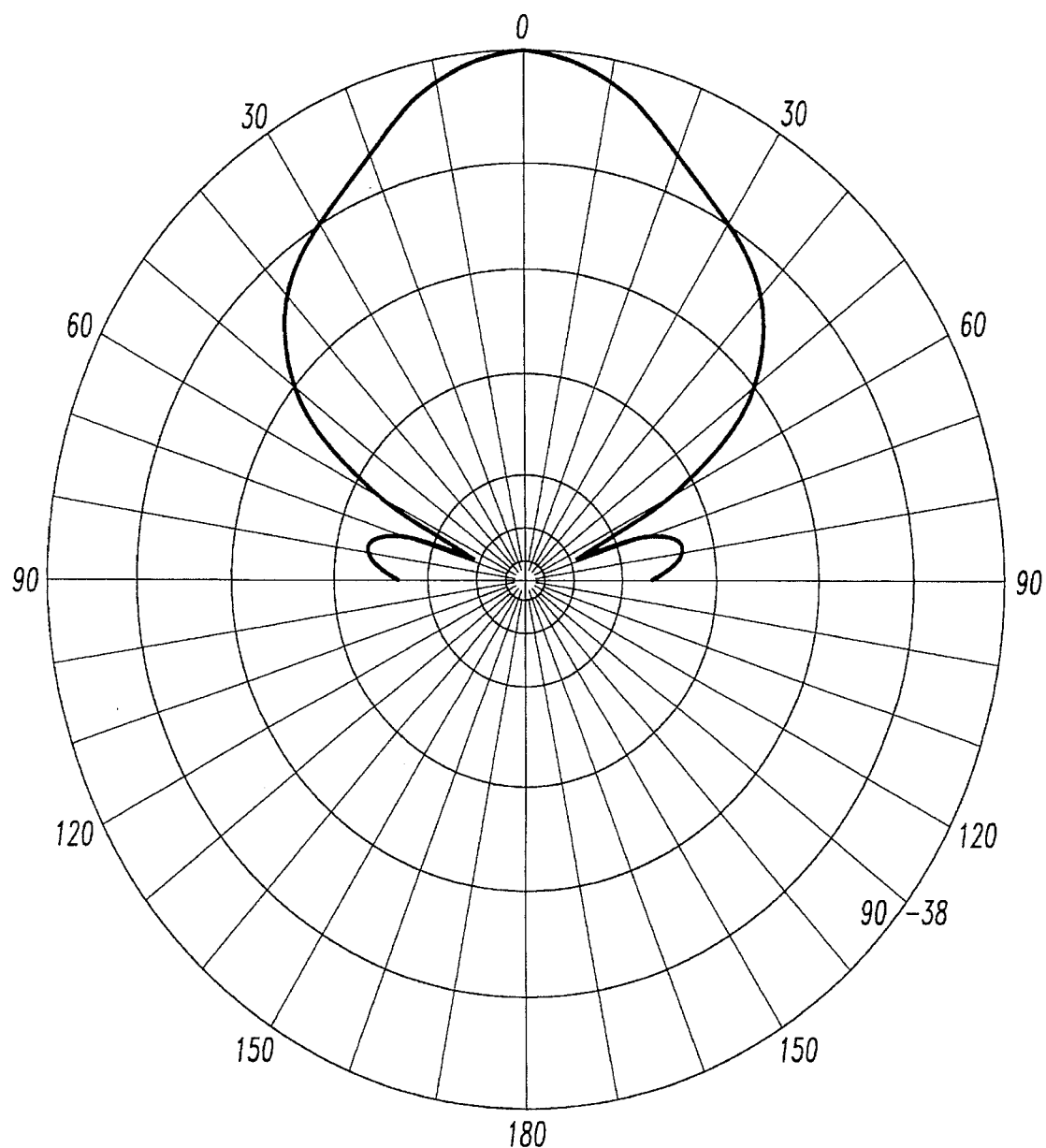
FIG. 10 illustrates a computed beam pattern at 200 kHz in the preferred embodiment of the present invention.

FIG. 10 illustrates a third beam pattern utilizing the asymmetric shading coefficients discussed above. The center frequency in FIG. 10 is 200 kHz and the beamwidth is 28.25. Even at 200 kHz, the amplitude of the sidelobes is negligible. From FIGS. 8–10 it is evident that the use of a higher frequency produces a narrower beamwidth, which improves detectibility in the beamwidth direction. However, when a high enough frequency is utilized, as illustrated in FIG. 10, sidelobes begin to appear.

Figure 11:
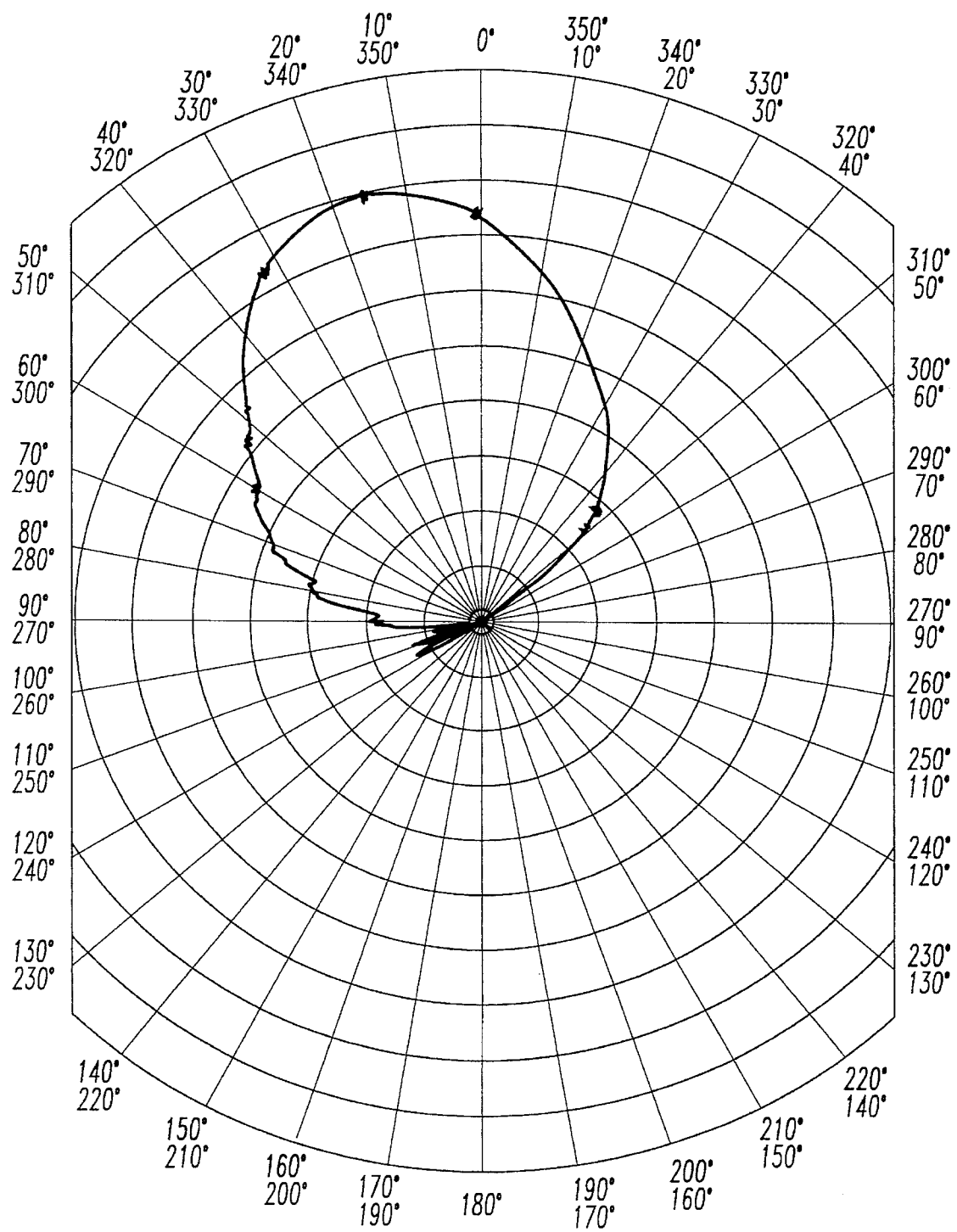
FIG. 11 illustrates the beam pattern of FIG. 9, in more detail as measured on a prototype of the present invention.

FIG. 11 illustrates a beam pattern, centered at 180 kHz in more detail. As illustrated in FIG. 11, the peak of the main beam is −139.1 dB, which occurs at −15.8°. The 3 dB down points occur at −31.6° and −1.3°. Additionally, the center of the main beam is at −16.4° and the width of the main beam is 30.3°. The beam pattern illustrated in FIG. 11 is an excellent approximation of tapered beam patterns which would be achieved from significantly more expensive acoustic apertures, including many more elements.

In summary, the present invention achieves a beam pattern, which is substantially equivalent to a beam pattern achieved with a large number of elements, utilizing only two elements. The use of only two elements permits the array to be extremely simple because wiring and cabling for only two elements is required and only two inputs are supplied to the beamformer, thereby requiring less computer processing time to perform the beamforming operation.

The present invention also employs a novel technique of asymmetrically amplitude shading outputs of the two elements in order to achieve the desired beam pattern.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. An apparatus comprising:
    at most two array elements for receiving acoustic energy from a plurality of directions; and
    beamforming means for processing the acoustic energy to produce a beamformed output which enhances detectivity in at least one of the plurality of directions,
    wherein said beamformer means asymmetrically amplitude shades the acoustic energy received from said at most two array elements.
2. The apparatus of claim 1, wherein the beamformed output is a tapered beam pattern which approximates a beamformer output from an array including at least three array elements.
3. The apparatus of claim 1, further comprising output means for outputting the beamformed output.
4. The apparatus of claim 3, wherein said output means is one of a navigational processor from an unmanned underwater vehicle, a printer, plotter or CRT.
5. The apparatus of claim 1, wherein said at most two array elements are vehicle or hull mounted and said apparatus is utilized in shallow water sonar applications.
6. The apparatus of claim 1, wherein said beamforming means produces the beamformed output by passively summing an output of each of said at most two array elements.
7. The apparatus of claim 1, wherein the asymmetric amplitude shading is a two level asymmetric amplitude shading.
8. The apparatus of claim 7, wherein coefficients of the two level asymmetric amplitude shading are varied to produce a range of angular response shapes.
9. The apparatus of claim 7, wherein the two level asymmetric amplitude shading includes summing in phase, 100% of an output received from a first of said at most two array elements and 23% of an output received from a second of said at most two array elements.
10. The apparatus of claim 9, wherein the two level asymmetric amplitude shading achieves sidelobe cancellation.
11. A method of shading outputs of at most two array elements comprising the steps of:
    (a) receiving acoustic energy from the at most two array elements from a plurality of directions; and
    (b) processing the acoustic energy to produce a beamformed output which enhances detectivity in at least one of the plurality of directions,
        said step (b) including the sub-step of asymmetrically amplitude shading the acoustic energy received from the at most two array elements.

12. The method of claim 11, wherein the beamformed output is a tapered beam pattern which approximates a beamformer output from an array including at least three array elements.

13. The method of claim 11, further comprising the step of:

(c) outputting the beamformed output.

14. The method of claim 13, wherein the beamformed output is output to one of a navigational processor for an unmanned underwater vehicle, or a printer, plotter or CRT.

15. The method of claim 11, wherein the at most two array elements are vehicle or hull mounted and said method is utilized in shallow water sonar applications.

16. The method of claim 11, said step (b) including the sub-step of passively summing an output of each of the at most two array elements.

17. The method of claim 11, wherein the asymmetric amplitude shading is a two level asymmetric amplitude shading.

18. The method of claim 17, wherein coefficients of the two level asymmetric amplitude shading are varied to produce a range of angular response shapes.

19. The method of claim 17, wherein the two level asymmetric amplitude shading includes summing in phase, 100% of an output received from a first of the at most two array elements and 23% of an output received from a second of the at most two array elements.

20. The method of claim 17, wherein the two level asymmetric amplitude shading achieves sidelobe cancellation.

21. A shallow water sonar apparatus, comprising:

an array, consisting of two elements, for receiving acoustic energy from a plurality of directions; and beamforming means for processing the acoustic energy received by said two elements to produce a tapered beam pattern which approximates a beamformer output from an array including more than two elements;

said beamforming means asymmetrically amplitude shading outputs of said two elements, wherein the output of a first of said two elements is summed with the output of a second of said two elements multiplied by a coefficient of 0.23.

22. A method of processing outputs of a shallow water sonar array, consisting of two elements, said method comprising the steps of:

(a) receiving acoustic energy from the two elements from a plurality of directions; and (b) processing the acoustic energy received by said two elements to produce a tapered beam pattern which approximates a beamformer output from an array including more than two elements by asymmetrically amplitude shading outputs of the two elements;

wherein the output of a first of the two elements is summed with the output of a second of the two elements multiplied by a coefficient of 0.23.

* * * * *